(No Model.) 2 Sheets—Sheet 1.

T. TOLSON.
UNICYCLE.

No. 591,025. Patented Oct. 5, 1897.

Witnesses. Inventor.
Lauritz N. Möller Thomas Tolson
Charles A. Harris by Alban Andrieu
his atty.

(No Model.) 2 Sheets—Sheet 2.

T. TOLSON.
UNICYCLE.

No. 591,025. Patented Oct. 5, 1897.

Witnesses
Lauritz N. Möller
Charles A. Harris

Inventor
Thomas Tolson
by Alban Andrieu
his atty.

UNITED STATES PATENT OFFICE.

THOMAS TOLSON, OF BOSTON, MASSACHUSETTS.

UNICYCLE.

SPECIFICATION forming part of Letters Patent No. 591,025, dated October 5, 1897.

Application filed December 29, 1896. Serial No. 617,417. (No model.)

*To all whom it may concern:*

Be it known that I, THOMAS TOLSON, a citizen of Great Britain, and a resident of Boston, in the county of Suffolk and State of Massachusetts, have invented new and useful Improvements in Unicycles, of which the following, taken in connection with the accompanying drawings, is a specification.

This invention relates to improvements in unicycles; and it has for its object to increase the speed of vehicles of this kind by using arm-power in addition to leg or foot power for the propulsion of the vehicle, as will hereinafter be more fully shown and described, reference being had to the accompanying drawings, wherein—

Figures 1, 3, 4:
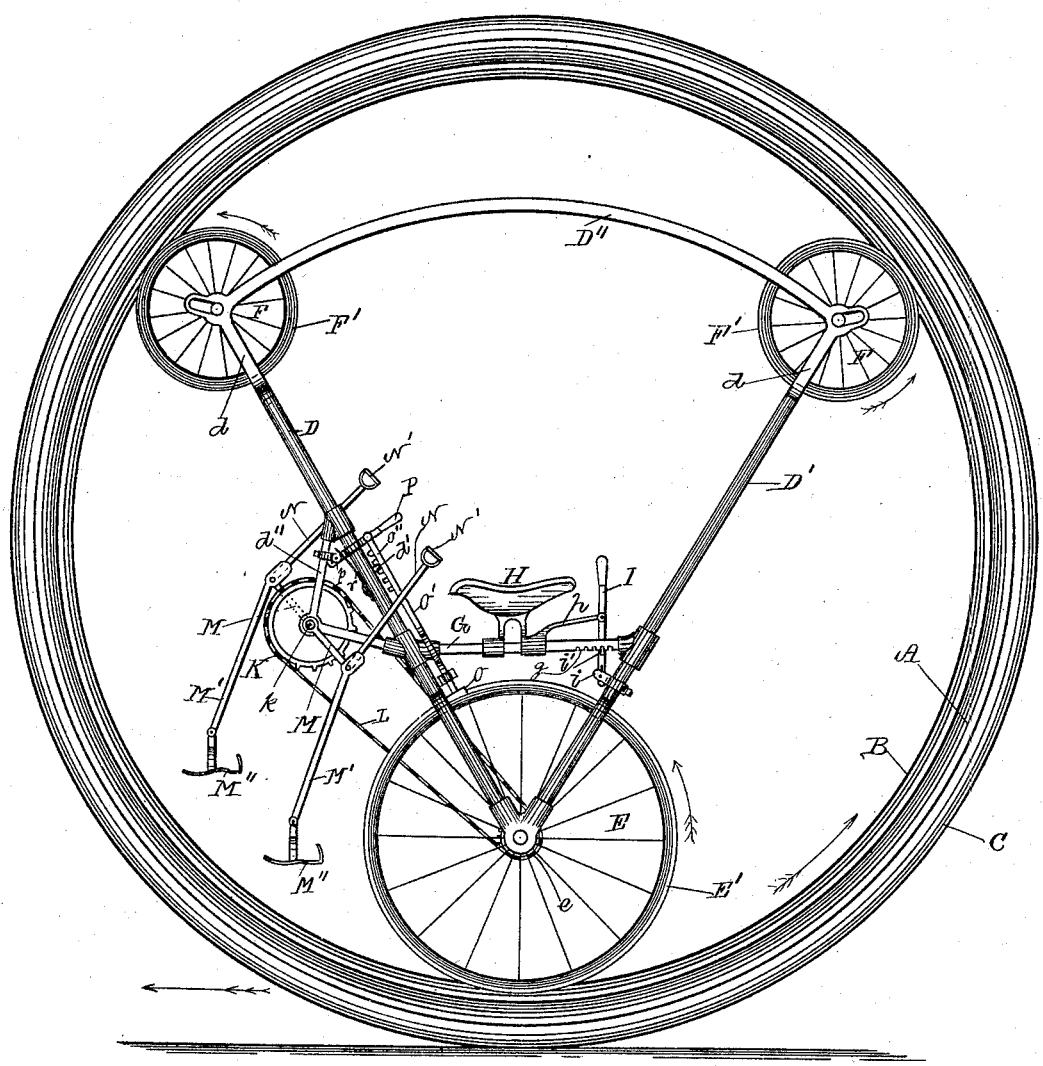
Figure 2:
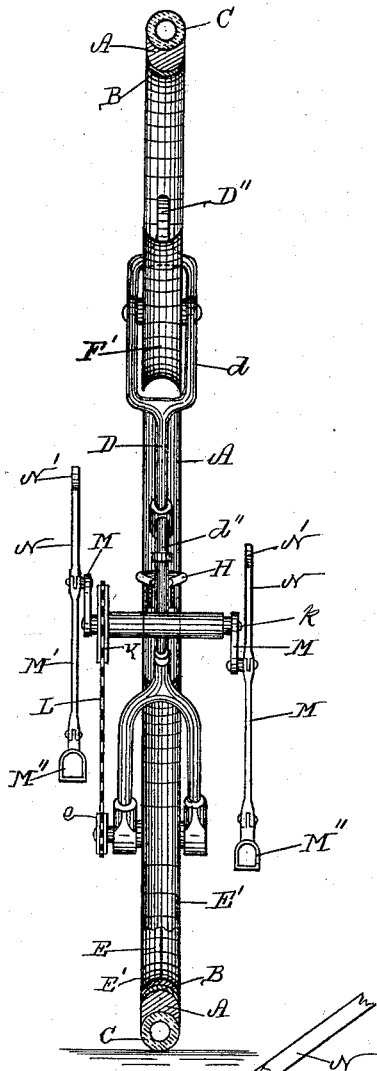
Figure 5:
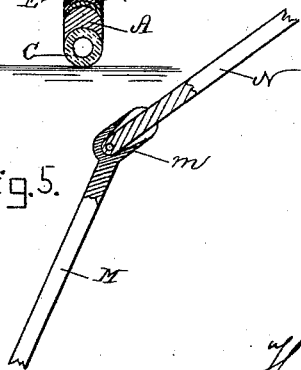

Figure 1 represents a side elevation of the improved unicycle. Fig. 2 represents an end elevation of the same, parts shown in section. Fig. 3 represents a detail side elevation of the saddle and its adjusting device. Fig. 4 represents a longitudinal section on the line 4 4, shown in Fig. 3; and Fig. 5 represents a detail sectional view of the union of the hand and pedal rods.

Similar letters refer to similar parts wherever they occur on the different parts of the drawings.

This my improved unicycle consists of an outer wheel-ring, preferably composed of a wood or steel rim A, reinforced on its interior with a convex metal, preferably sheet-steel, auxiliary rim or lining B, as shown in Figs. 1 and 2.

To the outside of the rim A is secured the rubber tire C, which is preferably a cushion or pneumatic one, as may be desired.

Inside of the outer wheel-ring is arranged the preferably triangular-shaped frame D D' D'', in the lower forked portion of which is journaled the driving-wheel E, preferably provided with a sheet-steel rim E', which is concave in section and adapted to be guided on and to roll on the inner convex steel rim B of the outer wheel-ring, as shown in Figs. 1 and 2.

The upper ends of the rods or tubes D D' are preferably provided with the respective forks $d$ and $d$, in which are journaled the guide-wheels F F, having concave steel rims F' F', adapted to be guided on and roll against the convex steel rim B of the outer wheel-ring, as shown in Figs. 1 and 2.

The frame portions D D' are united together by means of a saddle-support or saddle-bar G, which is preferably made square or polygonal in section, and on said bar is the saddle H, adjustable forward and back. In connection with such adjustable saddle I use a locking device for securing it in its adjusted position, such device consisting of a lever I, loosely pivoted or hung at $i$ to the frame portion D' and provided with a tooth or projection $i'$, adapted to be held interlocked with the rack-bar $g$ on the under side of the saddle-bar G, as shown in Figs. 1, 3, and 4.

$h$ is a spring secured in a suitable manner to the saddle or its post, its free end being suitably connected to the lever I, so as to cause the tooth $i'$ on said lever to be held interlocked in any desired position of the rack $g$ on the saddle-bar G after the position of the saddle has been adjusted. By this arrangement the rider is enabled to adjust the forward or back position of the saddle while riding, and this is done simply by slightly depressing the lever I and moving it forward or back, as the case may require, until the desired adjustment of the saddle is obtained, when by letting go the said lever I it will be automatically raised upward by the influence of the springs $h$ sufficiently to cause its tooth or projection $i'$ to be held interlocked with the rack $g$, as shown in detail in Figs. 3 and 4. The saddle may thus be adjusted more or less forward while riding up hills, and vice versa while descending.

$d''$ is a bracket of suitable construction secured to the frame portion D, and in such bracket is journaled the crank-shaft $k$, to which is secured the large sprocket-wheel K, from which leads a chain L to a smaller sprocket-wheel $e$ on the wheel E, as shown. Instead of sprocket wheels and chain any other desirable or well-known mechanism may be employed for conveying motion from the crank-shaft $k$ to the driving-wheel E without departing from the essence of my invention.

M M are the cranks, secured at opposite ends of the shaft $k$ in diametrically opposite positions, as is common in devices of this kind. To the end of each such crank is hung or pivoted a pedal-rod M', and to the lower end of the latter is hung or pivoted a pedal or stirrup M'', as shown. To the end of each crank M or at the junction with it and its pedal-rod M' is pivoted an arm-rod N, provided at its upper end with a suitable grip or handle N', as shown in Figs. 1 and 2.

In connection with this my improved unicycle I use a suitable brake device, preferably consisting of a brake-shoe O, adapted to brake against the wheel-rim E' and attached to an upwardly-projecting brake-rod O', suitably guided relative to the frame portion D and provided on one side with a toothed rack O'', adapted to be interlocked in various positions with a tooth or projection d' on the frame portion D, as shown in Fig. 1.

To the upper end of the brake-rod O' is pivoted a hand-lever P, loosely pivoted at p to the bracket d'' and held in locked position by means of a suitable spring r, as shown in Fig. 1.

To release the brake-shoe O from the driving-wheel E, it is only necessary to draw the lever P outward from the frame portion D sufficient to disengage the locking-tooth d' on the frame portion D from the rack O'', when the brake-rod O' is released and may be moved upward, so as to release the brake-shoe O from the wheel E. Thus it will be seen that the brake may be held and retained in locked or unlocked position, as may be desired by the rider.

The operation is as follows: The rider, after mounting the saddle H, places his or her feet on the pedals M'' M'' and grasps with the hands the handles N' N', and by thus alternately working the pedals with the feet and legs and the handle-bars N N with the hands and arms the sprocket-wheel K is rotated with increased power as compared with pedal action only, and consequently a greater power and speed is imparted to the driving-wheel E, particularly as a higher gear—that is, an increase between the size of the sprocket-wheel K as compared with the sprocket-wheel e'—may be employed, thus increasing the speed and power imparted to the driving-wheel E. The wheel E as it is being rotated in the direction of arrow shown thereon in Fig. 1 causes it to ride upward on the interior of the outer wheel-ring and at the same time imparts a quick rotary motion to said outer wheel-ring, causing it to roll forward on the ground in the direction as shown by arrow outside said wheel-ring in Fig. 1. In practice I prefer to provide the upper end of each pedal-rod M' with a socket m, as shown in Fig. 5, so as to limit the oscillating motion of the arm-rod N relative to the pedal-rod M' and also for the purpose of preventing the arm-rod N from dropping downward when the rider releases his hold on the handle N'.

What I wish to secure by Letters Patent and claim is—

1. In a unicycle a frame having a saddle-supporting bar G, combined with a saddle H, longitudinally adjustable thereon, a lever pivotally connected to the frame and having a tooth or projection adapted to interlock in teeth on the saddle-bar and a spring for holding said lever and saddle in the adjusted locked position substantially as and for the purpose set forth.

2. In a unicycle, in combination, an outer wheel-ring and a propelling-wheel arranged to be frictionally rotated against the interior of said wheel-ring and a brake device consisting of a brake-rod, provided with a brake-shoe and having teeth adapted to interlock with a projection on the interior frame and a spring-pressed lever for operating said brake and to hold it in locked position after being set or released substantially as described.

3. In combination, in a unicycle or velocipede driving device, a crank-shaft, cranks secured thereto, pedal and arm rods pivoted to said cranks, the pedal-rod having a socket m for the purpose of limiting the oscillating motion of the arm-rod substantially as herein set forth and described.

In testimony whereof I have signed my name to this specification, in the presence of two subscribing witnesses, on this 10th day of December, A. D. 1896.

THOMAS TOLSON.

Witnesses:
ALBAN ANDRÉN,
LAURITZ N. MÖLLER.